United States Patent [19]
Sugiyama

[11] Patent Number: 5,334,816
[45] Date of Patent: Aug. 2, 1994

[54] LASER BEAM MACHINING APPARATUS AND METHOD FOR ADJUSTING THE HEIGHT OF ITS CONDENSER LENS

[75] Inventor: Tsutomu Sugiyama, Osaka, Japan

[73] Assignee: Matsushita Electric Industrial Co., Ltd., Kadoma, Japan

[21] Appl. No.: 974,436

[22] Filed: Nov. 12, 1992

[30] Foreign Application Priority Data

Feb. 3, 1992 [JP] Japan .................................. 4-017359
Mar. 13, 1992 [JP] Japan .................................. 4-055178

[51] Int. Cl.$^5$ .............................................. B23K 26/02
[52] U.S. Cl. .......................... 219/121.83; 219/121.75; 219/121.82; 219/121.84
[58] Field of Search ............. 219/121.83, 121.82, 219/181.84, 121.75

[56] References Cited

U.S. PATENT DOCUMENTS

| | | | |
|---|---|---|---|
| 4,689,467 | 8/1987 | Inoue | 219/121.76 |
| 4,764,655 | 8/1988 | Ortiz, Jr. et al. | 219/121.83 |
| 5,045,668 | 9/1991 | Neiheisel et al. | 219/121.83 |
| 5,061,839 | 10/1991 | Matsuno et al. | 219/121.83 |
| 5,118,918 | 6/1992 | Serrano | 219/121.78 |

FOREIGN PATENT DOCUMENTS

| | | |
|---|---|---|
| 4104344 | 9/1991 | Fed. Rep. of Germany . |
| 60-191686 | 9/1985 | Japan . |
| 60-255295 | 12/1985 | Japan . |

OTHER PUBLICATIONS

English Abstract of Inoue Japanese laid open appln. No. 58-183403, Sep. 1983.

Primary Examiner—C. L. Albritton
Attorney, Agent, or Firm—Cushman, Darby & Cushman

[57] ABSTRACT

In the laser beam machining apparatus, an optical sensor provided with a blue filter detects change of color of light emission from the machining spot on a workpiece irradiated by a machining laser beam from orange color light emission to blue color light emission, when laser beam intensity per area becomes above a certain level as a result of good focusing by a condenser lens; and the position of the condenser lens is controlled based on output of the optical sensor, in a manner that the optical lens lies in such a positional range that the blue color is emitted from machining spot.

11 Claims, 8 Drawing Sheets

LASER BEAM MACHINING APPARATUS AND METHOD FOR ADJUSTING THE HEIGHT OF ITS CONDENSER LENS

FIELD OF THE INVENTION AND RELATED ART STATEMENT

1. FIELD OF THE INVENTION

The present invention relates in general to a laser beam machining apparatus which performs such a machining as cutting, drilling or welding on a workpiece of soft Iron plate or the like, with such a laser beam emitting unit as $CO_2$ laser. In particular, it is concerned with such a laser beam machining apparatus that intends to a shortening in the preparation period for the machining, an improvement in the efficiency percentage and the product yield, and a stabilization of the product quality, and with a method for adjusting the height of the condenser lens in such an apparatus.

2. DESCRIPTION OF THE RELATED ART

Figure 6:
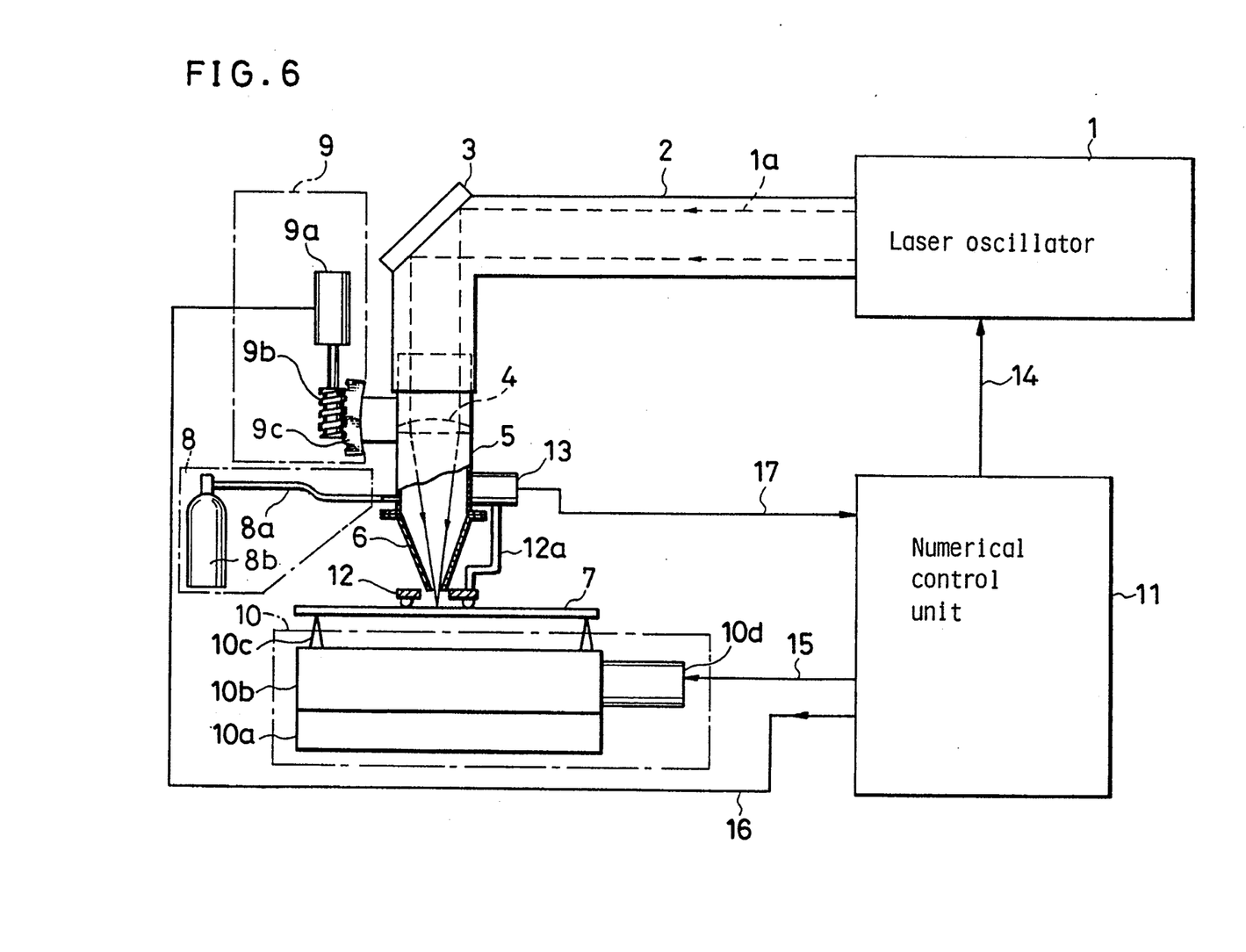
FIG.6 is a schematic diagram showing a prior art laser machining apparatus.

An example configuration of the prior art laser beam machining apparatus for cutting a soft iron plate or the like is shown in a schematic view of FIG.6. The prior art apparatus of FIG.6 has a laser oscillator 1, a laser beam guide 2, a mirror 3 for turning the laser beam 2, a condenser lens 4, a lens guide member 5 for supporting the lens 4, and a machining torch 6. Total length of the machining torch 6 and the lens guide member 5 is set approximately equal to the focal length of the condenser lens 4. There is also shown an elevating unit 9, which is for vertically moving the lens guide member 5 together with the machining torch 6 and is composed of a servo-motor 9a, a worm gear 9b provided on the shaft of the servo-motor 9a, and a worm rack 9c fixed on the lens guide member 5 and is engaging with the worm gear 9b.

The configuration of FIG.6 also has a machining table unit 10 composed of a machining table base 10a, a machining table 10b slidably mounted on said base 10a, a needle vice 10c fixedly mounted on said machining table 10b for supporting a workpiece 7, and a servo-motor 10d for driving the machining table 10b. There are also shown a numerical control unit 11, a tracing sensor sub-unit 12, a tracing sensor supporting rod 12a, a signal converter 13, an instruction signal 14 for the laser output, a servo instruction signal 15 for determining the shape intended by the machining operation and the machining speed, a servo Instruction signal 16 for setting the lens heights, and an output signal 17 issued from the tracing unit 12.

in the following paragraphs, the operation of the thus configured prior art laser beam machining apparatus, as well as the preparation process required in advance to the start of the actual machining process, will be described.

The laser oscillator 1 excites a laser medium contained therein and outputs the laser beam 1a. The laser beam 1a passing through the guide member 2 is reflected by the mirror 3 thereby turning the laser beam path by 90°. The optical axis of the turned laser beam is directed to the condenser lens 4 and is incident upon the condenser lens 4, and irradiates the workpiece 7. The workpiece 7 is mounted on the needle vice 10c on the machining table 10b, and is moved when the machining table 10b is driven by the servo-motor 10d. The machining torch 6, provided in a gap between the condenser lens 4 and the workpiece 7, is tapered in a manner that its inner diameter is gradually reduced to its minimum at a distal end, where it is close to the workpiece 7. The machining torch 7 serves to blow a known assist gas for machining, such as oxygen or algon, supplied by a gas cylinder 8b through a pipeline 8a in a manner that the flow of the gas becomes to be coaxial with the condensed laser beam 1a. Such gas for assisting laser machining is herein referred to simply as "assist gas ". The numerical control unit 11, which stores therein the Information regarding the machining conditions such as the machining shape, the moving rate of the workpiece 7 and the laser output and issues a laser output instruction signal 14 to the laser oscillator 1 for issuing the intended laser output, and also Issues a servo instruction signal 15 to the servo-motor 10d thereby to move the workpiece 7 on the machining table 10b so as to be machined in the intended shape.

In performing the above-mentioned machining, it is required beforehand to adjust the focus position of the condenser lens 4 to coincident to, e.g. a point of the distal end of the machining torch 6. The adjustment is made by changing the position of the condenser lens 4 in the lens guide member 5, or by varying the total length of lens guide member 5 and the machining torch 6. Next, a setting of the origin of the coordinate is performed on the numerical control unit 11 by moving the lens guide member 5, taking such a position of the machining torch 6 that the lower end tip of the machining torch 6 touches the surface of the workpiece 7 as the origin of the distance between the condenser lens 4 and the workpiece 7. Thereafter, the gap between the distal or lower end tip of the machining torch 6 and the workpiece 7 is re-adjusted to 2—5 mm. This is good for avoiding any cause of defective machining due to fixing disorder in the machining torch 6 and the condenser lens 4 attributable to the contact of any sputtered deposits on the surface with the lower end tip of the machining torch 6, which is produced by any possible bending or distortion of the workpiece 7 during the machining. By further subsequent adjusting of the gap between the distal end tip of the machining torch 6 and the workpiece 7 during the while performing several test machinings, a gap that would produce the maximum cutting rate or speed is set on the signal converter 13.

After the above-mentioned adjustment, the actual cutting is started. During the actual cutting, the numerical control unit 11 performs the machining by driving the servo-motor 9a in a manner that the gap between the machining torch 6 and the workpiece is maintained to that set at the signal converter 13.

In a case of performing a welding, a cutting or a drilling on a workpiece of soft iron sheet or the like in a laser machining apparatus of this kind, it is generally known and said that the maximum cutting rate and the minimum cutting-face roughness are achieved when the workpiece 7 is located In a range of several millimeters around the focus position of the condenser lens 4. Further, when the gap between the distal end tip of the machining torch 6 and the work piece 7 is maintained to several millimeters, the machining rate (speed) is high, because the removal of the melt-down products from the workpiece irradiated by the laser beam 1a is most accelerated by the assist gas for such gap. Since the above-mentioned distance between the focus position and the workpiece 7 and the gap between the distal end tip of the machining torch 6 and the workpiece 7 change when the thickness or material of the workpiece changes, it has hitherto been necessary to adjust and set the position of the machining torch 6 every time when the workpiece 7 or the condenser lens 4 is exchanged.

In addition, a plurality of machining operations are generally performed continuously or successively on the same single sheet of the workpiece when performing the above-mentioned machining. The surface temperature of the workpiece 7 is gradually raised with the progress of the continuous machining. That Is, the temperature is higher in the subsequent machining as compared with that in the precedent machining. The absorption factor of the laser beam by the workpiece is varied with the temperature rise, and thereby a change In the optimal or ideal distance between the focus position of the condenser lens 4 and the workpiece 7 is brought. However, In the prior art laser machining apparatus, the distance set at the signal converter 13 is fixed, and can not be adjusted.

As described in the above, in the prior art laser machining apparatus, it has been necessary to adjust and set the distance between the focus position of the condenser lens 4 and the workpiece 7 and the gap between the machining torch 6 and the workpiece 7 for every time of exchanging the workpiece 7 and/or the condenser lens 4. Such adjusting and setting requires long times for the preparation process before the start of the actual machining, and thus it remarkably has lowered the efficiency of the operation.

In addition to this, the numerical control unit 11 makes the signal converter 13 set the distance between the machining torch 6 and the focus position, as well as the gap between the machining torch 6 and the workpiece 7 constant. And by detecting the gap between the workpiece 7 and the machining torch 6 under actual machining, the machining torch 6 and the lens guide member 5 are vertically moved thereby to adjust the distance and the gap constant through a feed back operation. Therefore, even in a state where the absorption and reflection coefficients of the laser beam 1a by the workpiece vary depending upon the temperature and the surface condition of the workpiece 7 (thereby varying the optimum values for the distance between the machining torch 6 and focus position and the gap between the machining torch 6 and the workpiece 7), the actual distance between the machining torch 6 and the focus position of the condenser lens 4 and the gap between the machining torch and the workpiece 7 are fixed to and maintained at the initially set values by the signal converter 13 and the numerical control unit 11.

Furthermore, actual focal length of the condenser lens will vary from the nominal or designed or catalog focal length, because of manufacturing dispersion, thermal expansion, mechanical shocks, etc.

In such manner, the machining conditions deviate from their optimal states, and hence there arises another problem that the machining quality would vary when a plurality of machining operations are performed continuously or in sequence on a single workpiece 7.

OBJECT AND SUMMARY OF THE INVENTION

The present invention is proposed in order to solve the above-mentioned problems inherent to the prior art laser machining apparatus and has, as its object, a provision of an improved laser machining apparatus and its condenser lens height adjusting method.

According to the present invention, the setting operation for the positions of the focal point of the condenser lens and the machining torch as the preparing operation for the laser machining can be simplified.

Furthermore, according to the present invention, the machining yield and a stabilization in the machining quality can be improved, and that the machining speed can be retained always in its maximum value.

According to the present invention, there is provided a laser beam machining apparatus comprising:

a laser oscillator, a guide for transmitting laser beam generated by the laser oscillator, a condenser lens for converging the laser beam, a machining torch for blowing an assist gas upon an objective surface of a workpiece, source and gas transmission means for feeding the assist gas, a movable machining table for movably holding a workpiece for performing the machining thereon, a servo-motor for driving the condenser lens to vary a distance between the condenser lens and the workpiece, a numerical control unit for controlling and driving the servo-motor, the machining table and the laser oscillator, a tracing unit including a position-sensor and a signal converter and mounted on the machining torch, for detecting the distance between the condenser lens and the workpiece, the tracing unit having an aperture for permitting the passage of the laser beam and the assist gas therethrough; and a guide bearing for smoothly moving the tracing unit along the optical axis of the laser beam.

The gas for assisting the laser machining is referred to simply as "assist gas" in the present specification.

According to another aspect of the present invention, there is provided a method for adjusting the height of the condenser lens of a laser beam machining apparatus which includes;

a laser oscillator for generating a laser beam, a condenser lens for converging the laser beam, a machining torch for blowing an assist gas upon an objective surface of a workpiece, a movable machining table for movably holding a workpiece for performing the machining thereon, a servo-motor for driving the condenser lens to vary a distance between the condenser lens and the workpiece, a numerical control unit for controlling the servo-motor, the machining table and the laser oscillator, a sensor for detecting light emission of a particular color from a laser-irradiated spot of the surface of the workpiece and issuing an output when the emission is received, and a memory device provided on the numerical control unit for memorizing the distances between the condenser lens and the workpiece for a plurality of times with respect to the variation of the output of the sensor;

which method comprises;

irradiating the laser beam upon the workpiece varying the distance between the condenser lens and the workpiece in a range including the focal length of the condenser lens, memorizing in the memory device the maximum value and minimum value of the distances between the condenser lens and the workpiece when the emission of said particular color is issued, varying the laser irradiating spot on the workpiece by moving the latter, and setting a center position which is calculated on the basis of the memorized maximum and minimum distance.

In the case of using pulse laser beam, the apparatus further comprises:

a pulse counter which receives the output issued from the sensor, a signal register which holds the output of the pulse counter at the Instant Immediately before issuance of a driving signal, for every time when the numerical control unit outputs the driving signal for the servo-motor, and a comparator which receives the output of the pulse counter and the output of the signal register to perform a comparison between the both outputs, and issues the result of the comparison as a basis to control the servo-motor, and irradiating the laser beam in a pulse state upon the workpiece varying the average output of the pulsative pulse, varying distance between the condenser lens and the workpiece for every one period of the varying average output of the pulse, and setting the position of the condenser lens with respect to the workpiece at the instant of the inversion of the sign of the output of the comparator as an origin of the coordinate of the serve-motor.

In the above-mentioned method, said sensor may be an optical sensor, for detecting the emission issued from the laser-irradiated spot of the surface of the workpiece and for issuing an output when the color of said emission is blue.

Said sensor may alternatively be an audio sensor for detecting an explosive sound issued from the laser-irradiated spot of the surface of the workpiece and for issuing an output when said explosive sound Issued with a blue emission is detected.

In a case of a machining operation, wherein, a maximum machining performance is obtained when the focus position of the condenser lens is on the surface of the workpiece, for instance, in the drilling or the cutting operation of a thin soft iron sheet having a thickness of several millimeters or less, the cutting is started in this state.

Alternatively, the height adjusting of the condenser lens of a laser beam machining apparatus may be performed by an apparatus comprising:

a laser oscillator for generating a laser beam, a mirror for turning the laser beam, a condenser lens for converging the laser beam, a guide for guiding the laser beam and supporting the condenser lens, a machining torch for blowing an assist gas upon an objective surface of a workpiece, a movable machining table for movably holding a workpiece for performing the machining, and a source for feeding the assist gas and an inert gas, a source for feeding said assist gas and an inert gas, a change-over valve for selectively controlling mixing of gas to be fed to machining torch from the assist gas source and the inert gas source, a numerical control unit for controlling the machining table and the laser oscillator, and the adjusting method comprises the steps of;

setting the surface of the workpiece, in a range of approximately one fifth (1/5) of the length of a range of the blue emission above and below of the farther end from the focal point within such range of the lens height that the blue emission is detected, causing the numerical control unit to memorize the blue emission range at one machining cycle Just before the current machining cycle of the workpiece, irradiating the laser beam upon the workpiece while moving the machining torch vertically at the beginning of the next machining cycle in a range of one fifth (1/5) of the blue emission range memorized in the numerical control unit, and while blowing the inert gas upon the workpiece, detecting the blue emission issued from the surface of the workpiece, adjusting the lens height In a manner that the surface of the workpiece is to set to the lower end within such range of the vertical movement that the blue emission is detected, and causing a next machining to start while blowing the assist gas for the machining.

In a case of performing a machining operation, wherein the focus position of the condenser lens is several millimeters away from the surface of the workpiece, for instance in the cutting operation of a medium thickness soft iron sheet of a plate thickness of about 10 mm or more, this method is preferably employed.

In the above-mentioned methods, a procedure for setting the origin of the coordinate of said servo-motor may be performed by causing the memory device In said numerical control unit to memorize said procedure and run said procedure, accordingly.

In accordance with the above-mentioned configuration and method, it is now made possible to set the machining conditions with ease to such conditions that the absorption factor of the laser beam by the workpiece as well as the machining rate is at their maximum. Namely, the present invention is characterized in that it utilizes a phenomenon that the color of the emission issued from the laser irradiated spot of the surface of the workpiece changes from orange to blue when the laser intensity at the spot exceeds a critical intensity of $10^6/cm^2$ or higher in the case of, for instance the workpiece of soft Iron or stainless steel. At the same time with the color change an explosive sound is produced. The emission issued from the surface of the workpiece is monitored by an optical sensor with blue filter, and the machining torch is moved upward or downward while changing the position of the workpiece, and the blue emission is detected in a certain range including the focal point of the condenser lens. The range of producing the change of light color is utilizable for making the controlling to obtain the maximum absorption factor and the maximum machining rate. Also the explosive sound is utilizable for the control In the machining.

In the present invention, the setting of the focus position can automatically be performed by repeating the above-mentioned procedure for several times, and by memorizing into the numerical control unit the center of the upper limit and the lower limit of the blue emission range as the focal point of the condenser lens.

In addition, the positions of the machining torch and of the condenser lens that produce a higher absorption factor by the workpiece is corrected by confirming the boundaries of region of the blue emission for every machining cycles, thus preventing the reduction of production yield attributable to dispersion of in the machining quality.

By the laser beam machining apparatus built In accordance with the present invention and its method for adjusting the height of the condenser lens performed with this apparatus, the assist gas between the machining torch and the workpiece as well as the relative position of the focus position with respect to the workpiece can always be maintained to their optimum ones. And the dispersion in the setting of the focus position due to personal difference of the operator as well as the dispersion in the focal length of the condenser lens itself can be minimized, thereby preventing the scatter in the machining quality and the reduction in the production yield.

Further, since the operation for setting the focus position to the surface of the workpiece can be automated, It is now possible greatly to reduce the time required for the preparing process of the actual machining operation, and to dispense with the special skill of the operator for setting the focus position to the surface of the workpiece.

Moreover, since the height of the condenser lens is set to a position where the absorption factor at the surface of the workpiece is in its maximum, by means of combined operation of an optical sensor for detecting the blue emission, the condition required for maximizing the machining rate can be set easily and the scatter in the machining quality attributable to the scatter in the absorption condition of the laser beam on the workpiece can also be reduced.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG.4 (A) is a graph showing the relationship between the distance from the condenser lens and the diameter of the laser beam.

FIG.4 (B) is a graph showing the relationship between the distance from the condenser lens and the intensity of the laser beam.

FIG.4 (C) is a graph showing the relationship between the laser beam intensity and the absorption rate at the surface of the workpiece irradiated by the laser beam.

FIG.4 (D) is a graph showing the relationship between the distance from the condenser lens and the color of the light emitted from the workpiece irradiated by the laser beam in the presence of an inert gas.

FIG.5 (A) is a chart showing the pattern of the mean output override of the laser beam with the lapse of time.

FIG.5 (B) is a graph showing the variance in the laser beam intensity at three positions of the workpiece with the change in the pulse peak output of the laser beam.

FIG.5 (C) is a graph showing the sensor pulse output at three positions of the workpiece with the change in the pulse peak output of the laser beam.

DESCRIPTION OF THE PREFERRED EMBODIMENTS

In the following paragraphs, the present invention will be described in more detail with reference to the preferred embodiments shown In the attached drawings.

EXAMPLE 1

CONFIGURATION OF EXAMPLE 1

Figure 1:
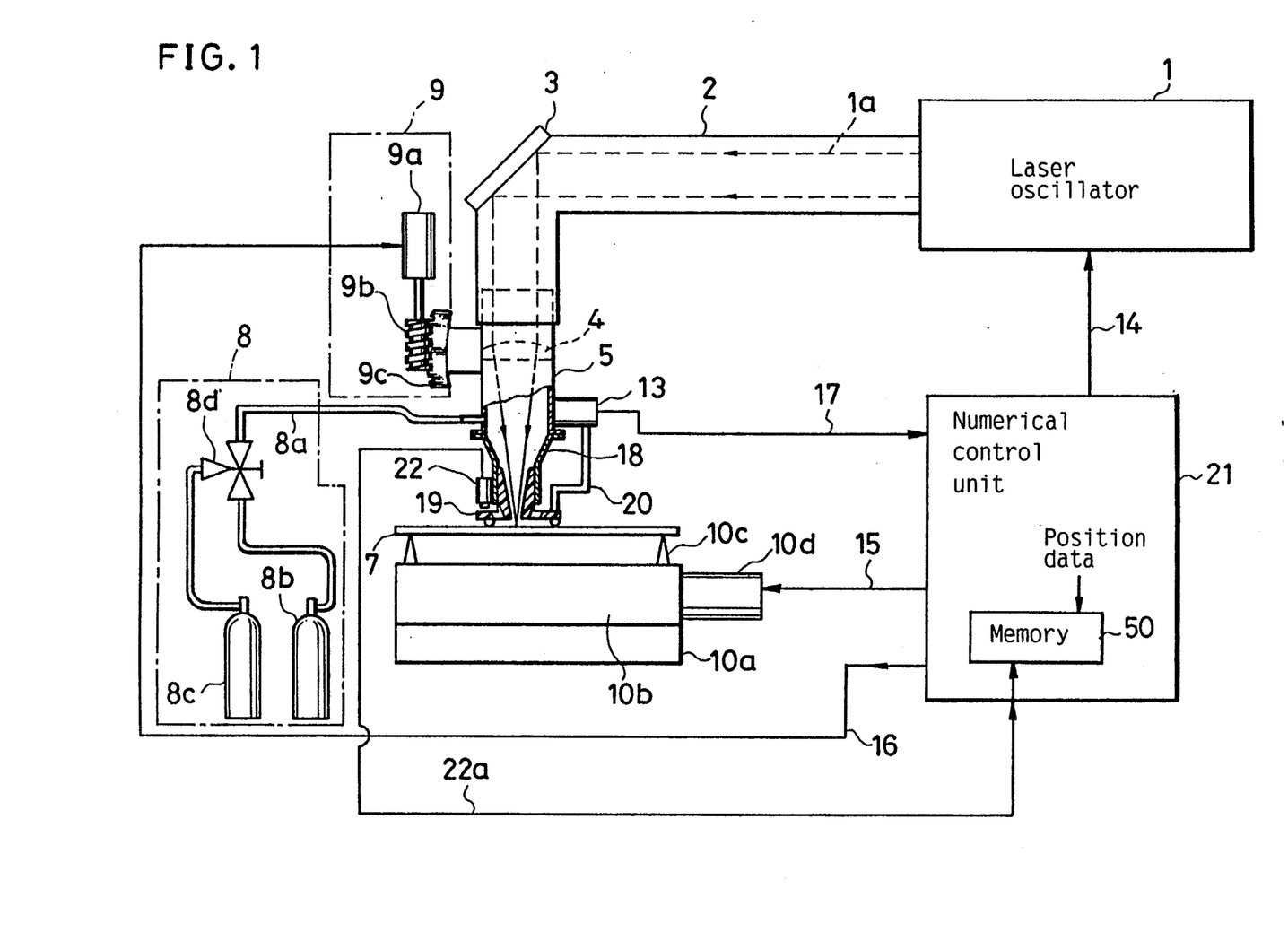
FIG.1 is a schematic diagram showing a first example built in accordance with the present invention.

FIG.1 shows a combined electric and mechanical diagram of a preferred embodiment built in accordance with the present invention. And FIG.2 is an enlarged cross-sectional view of the essential part of the machining torch and the related components of the embodiments shown In FIG. 1, including detailed configuration of the end part of a nozzle attached to a tracing sensor sub-unit.

It is to be noted that the same or similar parts and components described with reference to the above-mentioned prior art example will be referred to by the same or similar reference numerals or symbols in this Example, and they are also applicable to this Example; and therefore the description therefor will be omitted. The following description will be centered around the newly entered parts and components as well as their operation and advantages.

The parts and components which are characteristic to this Example are depicted in FIG. 1, wherein, a gas cylinder 8c containing an inert gas such as nitrogen is connected through, a change-over valve 8d and a pipe line 8a to a machining torch 18. A tracing sensor 19 for tracing shape and position of a work has a nozzle (as a tracing sensor sub-unit) and is supported by a sensor supporting rod 20. A numerical control unit 21 is similar to the numerical control unit 11 in FIG.6, but further includes a memory 50 for memorizing the position (i.e. height) of the condenser lens 4. An output 22a of an optical sensor 22 is given to the memory 50 of numerical control unit 21.

Figure 2:
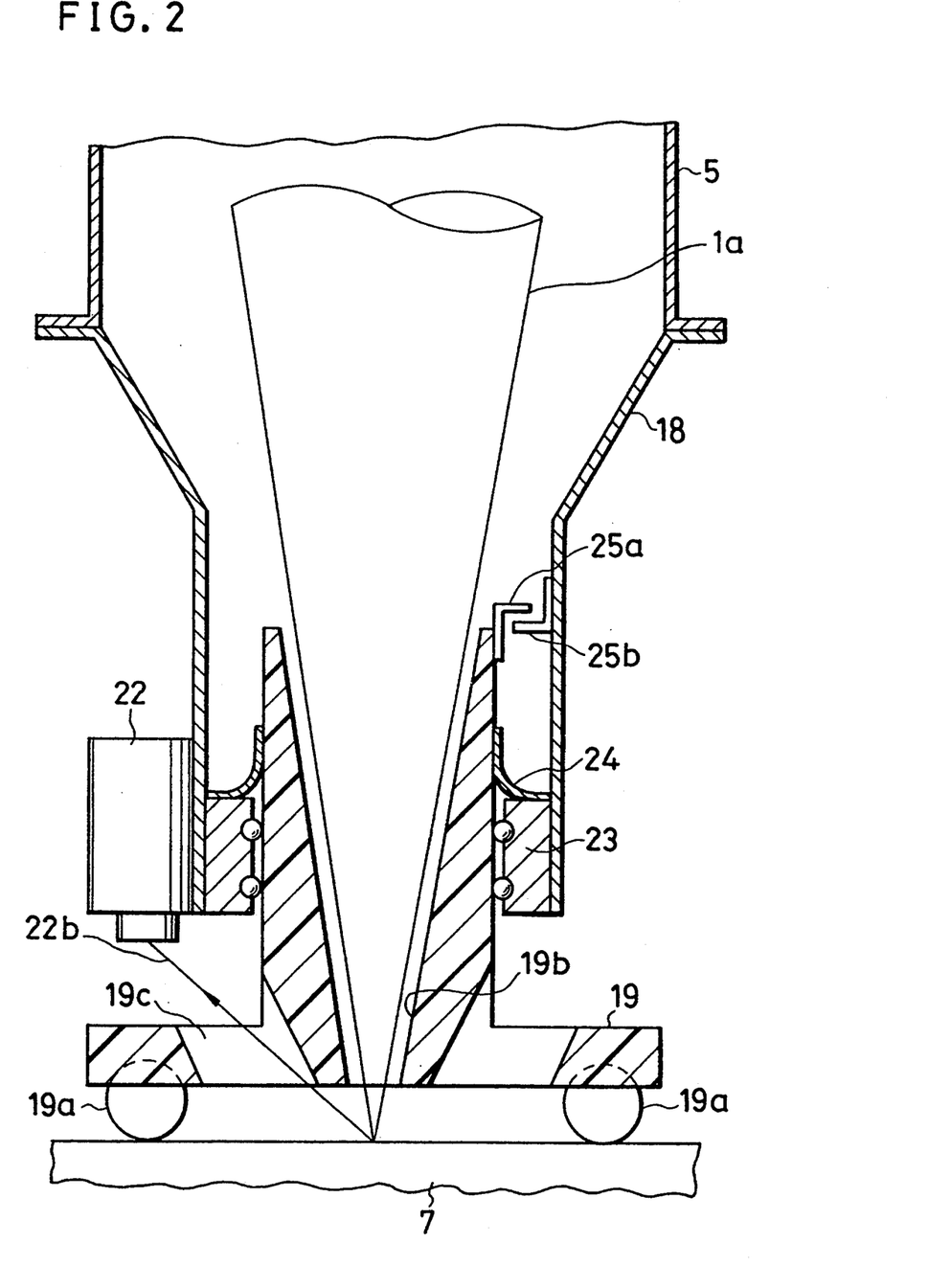
FIG.2 is an enlarged cross-sectional view showing the essential part of the machining torch and the related components of the embodiments shown in FIG.1.

As shown in FIG.2, the tracing sensor 19 has guide rollers 19a, a tapered vertical aperture 19b, at least an opening 19c for passing a light from a laser irradiated spot on the surface of the workpiece. The machining torch 18 has the optical sensor 22 provided with a blue optical filter 22, a guide bearing 23 for smoothly guiding relative vertical motion of the tracing sensor 19 therein and an assist gas-seal packing 24. Stoppers 25a is provided onto the top end part of the cylindrical part 19e of the tracing sensor 19, in a manner to engage with a stopper 25b fixed to the inner wall of the machining torch 18, for preventing the fall down of the tracing sensor 19.

In the laser machining apparatus as shown by FIGS. 1 and 2, the proximal end of the laser beam guide 2 is connected to an output port of the laser oscillator 1. A mirror 3 for turning the laser beam is provided in the mid part of the laser beam guide 2. The distal end of the laser beam guide 2 is configured as a cylinder of a circular cross-section, to which a cylindrical lens guide member 5 supporting a known condenser lens 4 is telescopically (slidably) fitted.

At the side wall of the lens guide member 5, there is provided the worm rack 9c, which is engaged with the worm 9b fixed on the shaft of the servo motor 9a. Therefore the lens guide member 5 vertically moved by the rotation of the servo motor 9a. Further, to another part of the side wall of the lens guide member 5 at the part opposite to the fixing site of the worm rack 9c, there is provided a signal converter 13. At still other part of the side wall of the lens guide member 5, there is further provided the gas pipe line 8a leading to the assist gas cylinder 8b. At the mid part of the gas pipe line 8a, a change-over valve 8d for switching the pipe line 8a is provided. The change-over valve 8d switches to flow the assist gas including the $N_2$ gas as a second auxiliary gas from the gas cylinder 8c, or alternatively the known assist gas from the gas cylinder 8b only.

The inner diameter of the machining torch 18, which is connected to the distal end of the lens guide member 5, is gradually reduced as it parts from the condenser lens 4 to a diameter of about half the diameter of the condenser lens 4, and is then shaped to be cylindrical up to its distal end. Inside the cylindrical part of the machining torch 18, there is provided a guide bearing 23 for slidably holding the cylindrical part of the tracing sensor 19. The lower end tip of the tracing sensor 19 form a nozzle. Inside the machining torch 18, there are also provided the an assist gas-seal packing 24 and the a stopper 25b for preventing the fall down of the tracing sensor sub-unit 19. The stopper 25b engages with another stopper 25a provided on the tracing sensor 19 for preventing the fall down of the latter. The numerical control unit 21 receives output 22a from the optical sensor 22, which is provided on the outside wall of the machining torch 18. The height of the machining torch 6 at the instance of variation of intensity of the optical sensor output 22a is memorized in a memory in the numerical control unit 21.

The inner face of the tapering aperture 19b of the tracing sensor 19 is configured in a downward tapering cone so as to pass the cone shape path of the converged laser beam with its center axial line coinciding with that of the optical axis of the laser beam. The center axial line of the assist gas flow is also made approximately to coincide with the optical axis. A plurality of the guide rollers 19a are accommodated in the recesses provided on the bottom face of the tracing sensor 19, so as to maintain a given clearance between its bottom face and the surface of the workpiece 7. In the base of the tracing sensor 19, there is provided the light guide openings 19c in a manner that the light emitted from the laser-irradiated spot of the workpiece can path therethrough and reach the optical sensor 22 without any hindrance.

In advance of start of the machining, the numerical control unit 21 is inputted with the information regarding the machining conditions, such as the intended shape of the workpiece 7 under the machining, and the intended moving rate of the workpiece 7, as well as the laser output. Then the control unit 21 issues the laser output instruction signal 14 to the laser oscillator 1, and it further issues the servo instruction signal 15 in accordance with the intended machining shape and moving speed to the servo motor 10d. Thereby the workpiece 7 mounted on the machining table 10b is moved for machining.

Operation of Example 1

In the following paragraphs, the operation of the thus configured laser beam machining apparatus will be elucidated.

In FIG. 1, the laser oscillator 1 emits a laser beam 1a by exciting a laser medium In accordance with the instruction received from the numerical control unit 11. The laser beam 1a passing through the laser guide 2 is reflected by the mirror 3 in the direction toward the condenser lens 4, and is incident upon the condenser lens 4. The laser beam is converged by the condenser lens, and then irradiates the workpiece 7, which is placed at the approximate focal point of the condenser lens 4. The workpiece 7 is mounted on the needle vice 10c which is placed on the machining table 10b and is moved with the movement of the machining table 10b by energization of the servo motor 10d.

The assist gas for the machining, which is typically $O_2$ (oxygen), is supplied from the auxiliary gas cylinder 8b through the pipe line 8a to the machining torch 18. The supplied assist gas is blown upon the laser-irradiated spot on the workpiece 7 through the gas-leading gap In the machining torch 18 and the tracing sensor 19, along the optical axis of the converged laser beam. In the above-mentioned manner, the laser beam machining is performed on the desired spot on the workpiece 7 mounted on the machining table 10b.

Relation between the beam diameter of the laser beam 1a and the distance between the laser Irradiated spot on the workpiece 7 and the condenser lens 4, obtained at the time of performing the laser beam machining using the laser beam 1a converged at the spot by the condenser lens 4 in the above-mentioned manner, is shown in the graph of FIG.4 (A). Relation between the laser beam intensity and the above-mentioned distance is shown In the graph of FIG. 4 (B). Relation between the laser beam intensity ($W/cm^2$) of the laser beam 1a at the time of irradiating the converged laser beam 1a upon the workpiece 7 of soft iron or stainless steel and the absorption factor of the laser beam by the workpiece 7 is shown in the graph of FIG. 4 ( C). Further, FIG. 4 (D) summarizes the over-all results of the measurement conducted by the present inventor on the relation between the variance of color of the light emission observed at the surface of the workpiece 7, which is irradiated by the converged laser beam 1a of various laser output intensity (shown as parameter) under the process of the laser beam radiation accompanied by the blowing of the inert gas 8c, and the above-mentioned distance.

As clearly indicated by the graph of FIG.4 (A), the beam diameter varies responding to the distance between the focusing position and the lens position. In the actually used range of distance, the beam intensity increases In reverse proportion to the cross-sectional area of the beam. Therefore, in the above range, the beam intensity varies in proportion to the square of the distance between the focus position and the lens position. When the beam intensity gradually increases and exceeds a critical intensity Io, which is about $10^6$ W or higher per 1 $cm^2$ in the case of machining soft iron or stainless steel, the absorption factor at the surface of the workpiece 7 abruptly rises; and at that instance the color of the emission changes from red or orange to blue, as shown on the graph of FIG.4 (D). As shown in FIG.4 (B), in a case of the highest output "a", the beam intensity reaches the critical Intensity Io and the blue emission is observed in the range between the point Za and the converging position Zf, and also in the symmetric range which is between the converging position Zf and a position Za' which is in symmetry to the point Za with respect to the converging position Zf. In case of the second high laser output "b", the range, wherein the blue emission is obtained, is between the point Zb and the converging position Zf and that between the converging position Zf and a position Zb', which is symmetry to the point Zb with respect to the converging position Zf. Further, in case of the lowest output "c", the blue emission is obtained only at a point, i.e., the converging position Zf. As above-mentioned, the Intensity of the emission becomes to Its maximum at approximately center of each range wherein the blue emission is issued and the position equals approximately to the focal length of the condenser lens.

Since the critical intensity Io varies depending upon the temperature and the contamination of the surface of the workpiece 7, the width of such range in the distance from the focal position to the condenser lens 4 as to produce the blue emission also varies; but the center of the range of blue emission does not change. Further, it was found that, in a machining operation wherein the actual machining is performed in such a positional relationship that the focus position of the condenser lens 4 is at a position several millimeters apart from the surface of the workpiece 7 (e.g., in a cutting operation of medium thickness soft Iron sheet having a thickness of about 10 mm or more), the cutting speed becomes maximum at around the end of the blue emission range.

Figure 4A:
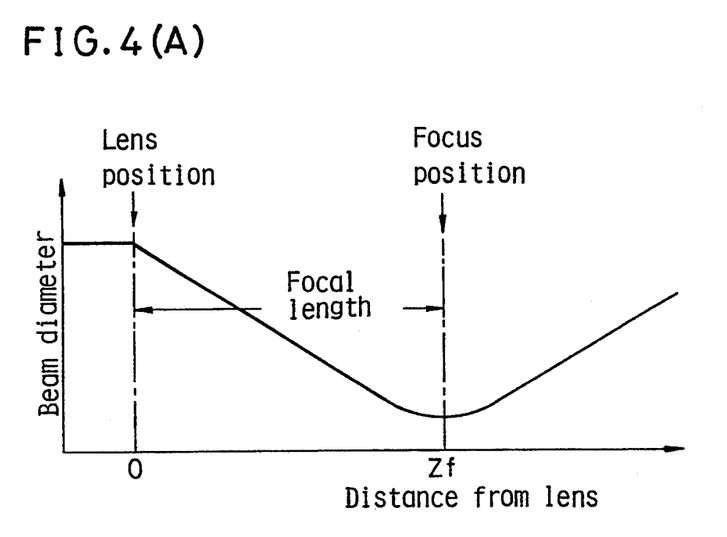
Figure 4B:
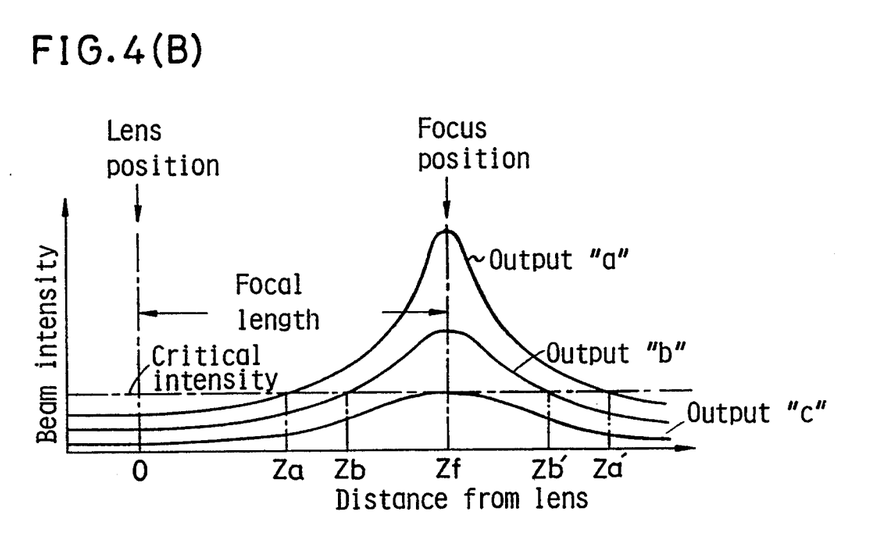
Figure 4C:
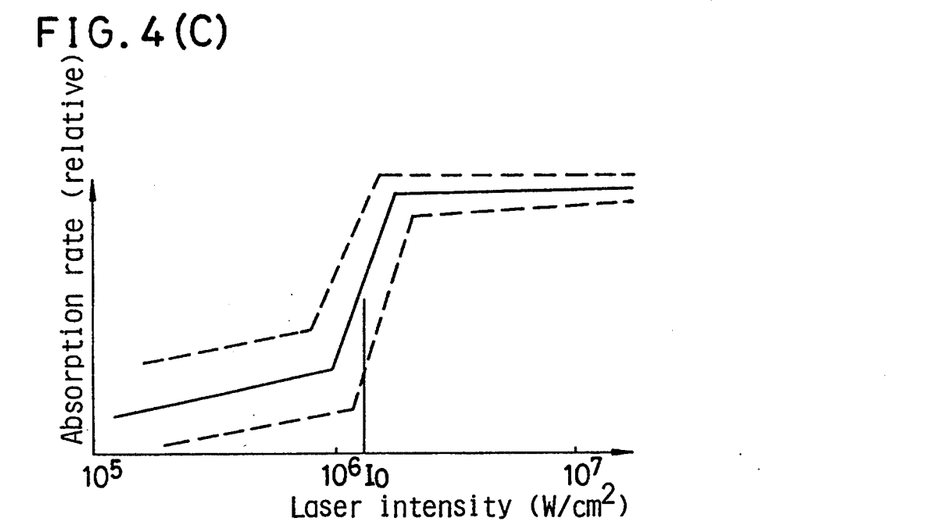
Figure 4D:
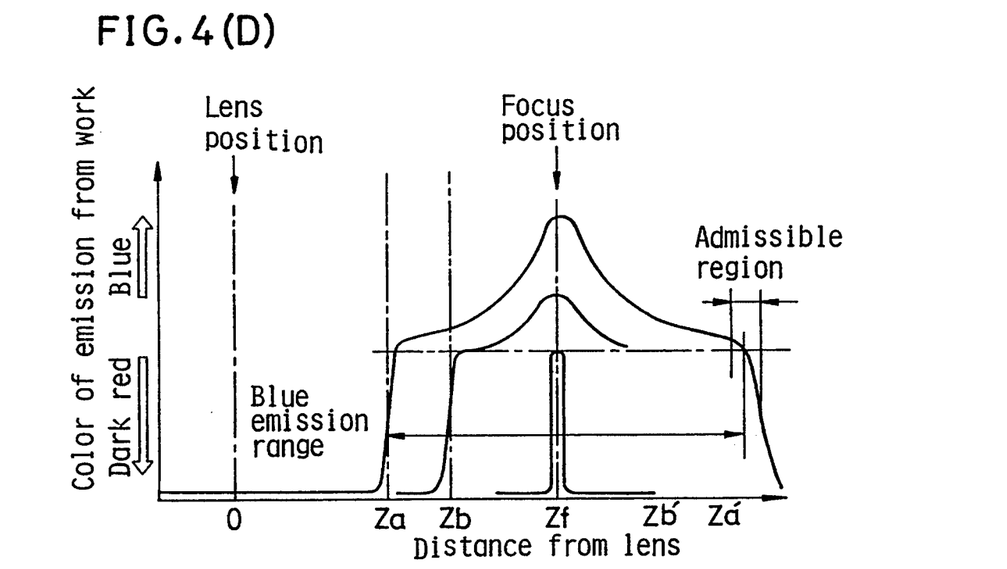

In the actual steps of laser beam machining of the first embodiment, first the numerical control unit 11 defines a "higher position" which is higher by about 10% of the focal length than a vertical level which is regarded to be the focus position of the condenser lens 4 and a "lower position" which is lower by about 10% of the focal length than the vertical level. And then the change-over valve 8d is changed over to the path to the inert gas cylinder 8c and permit the inert gas ($N_2$) 8c to blow upon the workpiece 7 through the machining torch 6. Thereafter, the numerical control unit 21 instructs the laser oscillator 1 to output the laser beam 1a, and to move the laser-irradiated spot to gradually in relation to the work piece by moving the work piece 7, and to vertically move the condenser lens 4 by the servo motor 9a in the range of ±10% of the focal length with respect to the position regarded to be the focus position. During this operation, the laser output is maintained to such a value as the output a or b shown by the graph of FIG.4 (B), that the distance from the condenser lens 4 has a certain width to make the laser intensity exceed the critical intensity Io.

As the converging point of the laser beam comes close to the focus position with the upward or downward movement of the condenser lens 4, the laser beam is converged and its intensity at the irradiated surface of the workpiece 7 increases in inverse proportion to the cross-sectional area of the laser beam. And the color of emission at the laser irradiated spot changes from orange to blue. Further, when the condenser lens 4 is moved vertically passing through the focus position, the laser beam diverges after passing the focus position and lowers its intensity, thereby changing the color of the emission at the laser Irradiated spot from blue to orange.

The optical sensor 22 mounted on the machining torch 18 is covered with a blue filter 22b on its light receiving part, and thus does not detect orange light. When the color of the emission at the laser irradiated spot changes from orange to blue during the laser irradiation, the blue light passes the blue filter 22b, and the optical sensor 22 detects the blue light which passes through the blue optical filter 22b, thereby issuing the output signal 22a. The memory 50 in the numerical control unit 21 memorizes the height positions of the condenser lens 4 at both times when the optical sensor 22 begins to issue the output signal 22a and when it stops to issue the output signal 22a, and calculates a center value of the both lens height positions. Then, the numerical control unit 11 drives the servo motor 9a to cause the condenser lens 4 to move upward or downward and sets the condenser lens 4 to a reference height that is the center value of the both heights. Since the converging position of the condenser lens 4 is at the center of the range wherein the color of the emission of the laser irradiated spot becomes blue, the converging position of the condenser lens 4 is set at the surface of the workpiece 7 by the above-mentioned procedure. The position of the condenser lens 4 is regarded here as the point of origin of the servo motor 9a that vertically moves the machining torch 18.

EXAMPLE 2

Configuration of Example 2

Figure 3:
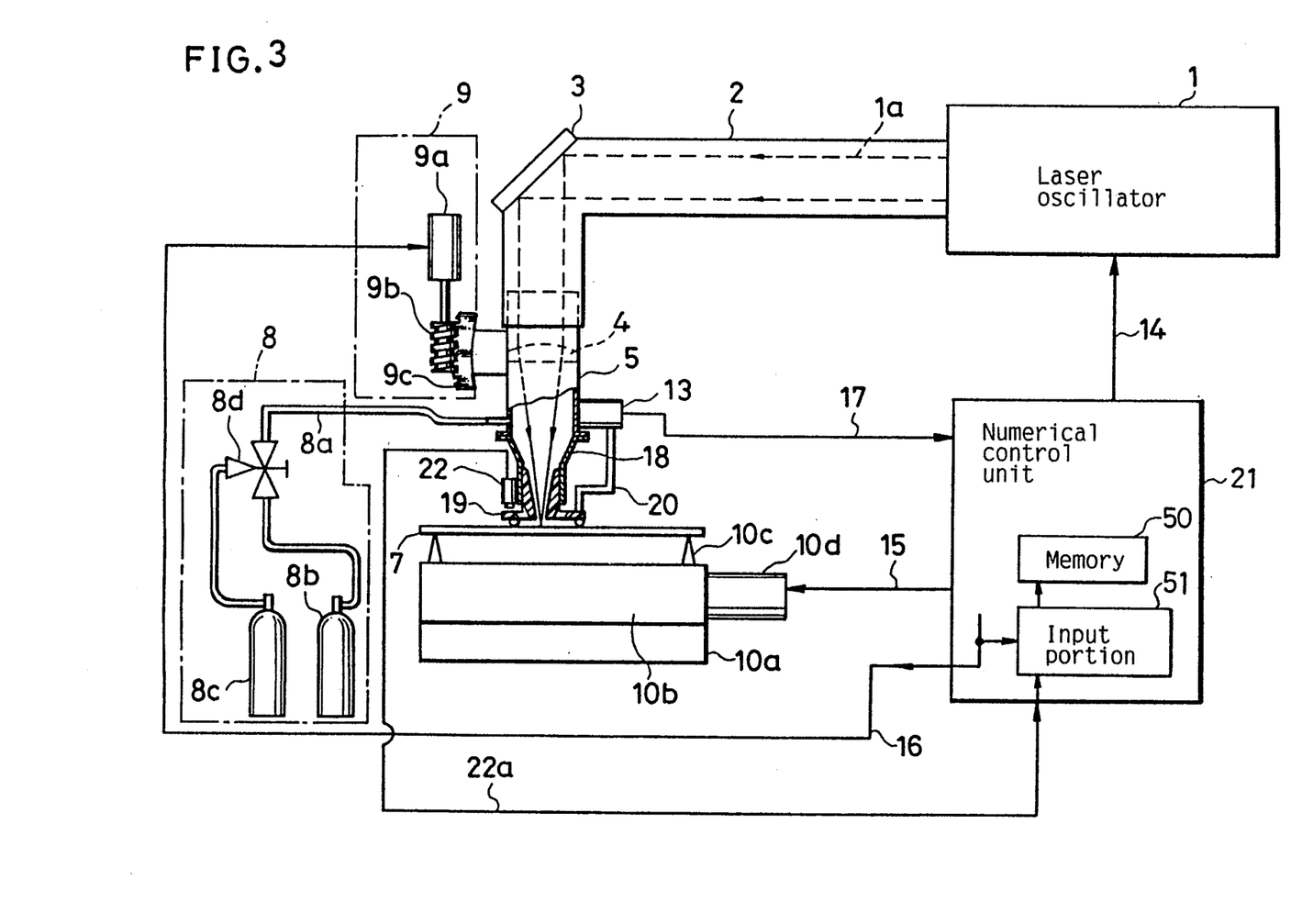
FIG.3 is a schematic diagram showing a second example built in accordance with the present invention.
Figure 3A:
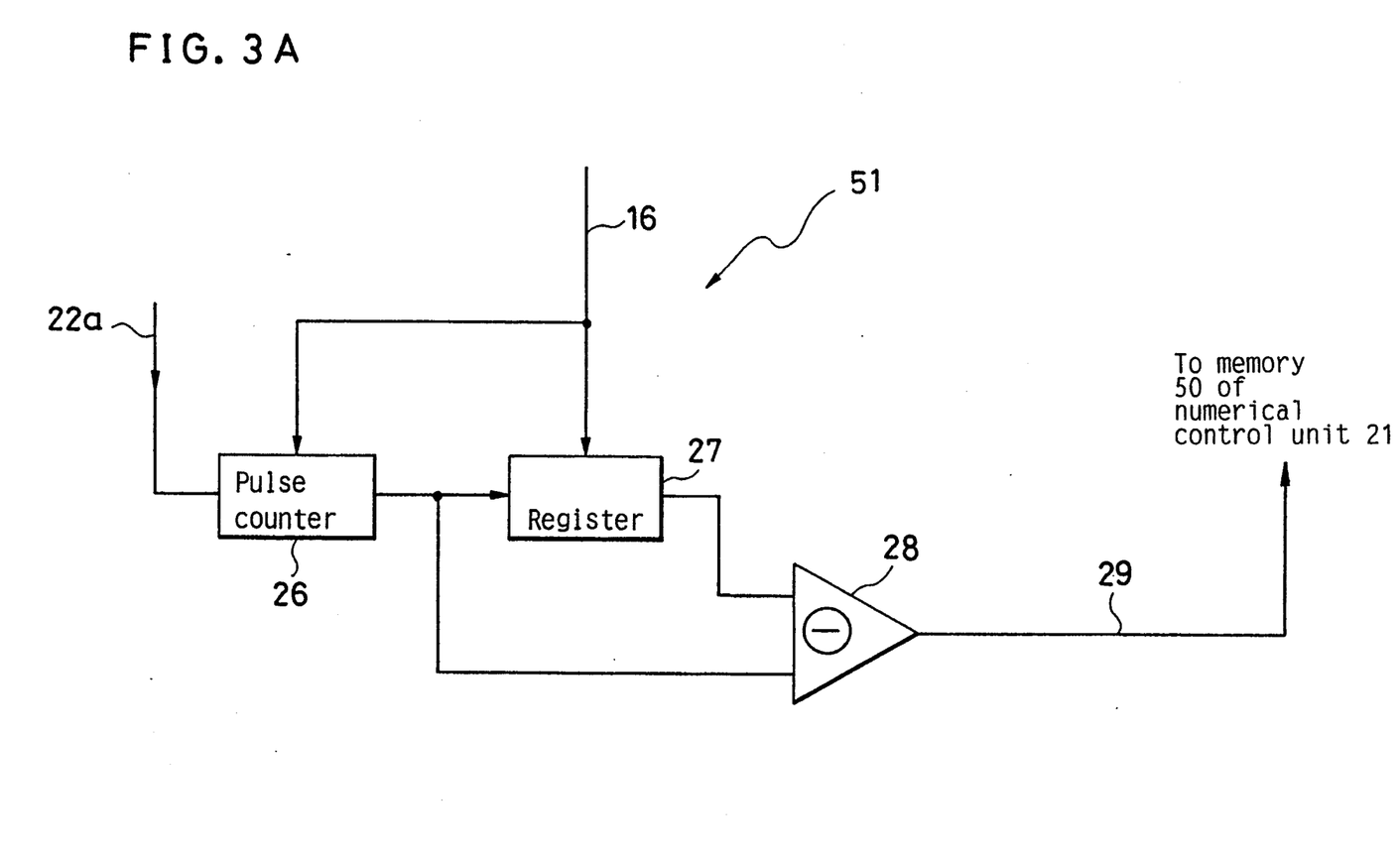
FIG.3A is a block diagram of the circuit of input portion 51 for processing the output signal of the light sensor for use in the second example of the present invention.

FIG.3 shows a schematic diagram of the second example and FIG.3A shows an input portion 51 In the numerical control unit 11, as a processing circuit for processing the output signal 22a from the optical sensor 22 for use in this second example. In the signal processing circuit shown in FIG.3A, the output signal 22a from the optical sensor 22 is inputted to a pulse counter 26, wherein the number of the pulse in the output signal 22a is counted, during the movement signal for the servo motor 9a is being outputted. The output of the pulse counter 26 is connected to a signal register 27 and to one of the inputs of a comparator 28. The signal register 27 memorizes the output of the pulse counter 26 at the beginning of the vertical movement signal 16 and outputs the memorized result. The output of the signal register 27 is connected to the other inputs of the comparator 28. The output 29 from the comparator 28 is used as the trigger signal for memorizing the positional data to the memory 50.

Operation of Example 2

In the following paragraphs, the operation of the second embodiment will be described. Since intensity of the light beam is proportional to the laser output, the range wherein the color of the emission from the laser-irradiated spot is blue, decreases with the reduction in the laser output from the level of output "a" through the outputs "b" and to "c", as shown in FIG.4 (B). And, for the beam intensity of the output "c" (namely in the case where only the peak value of the laser output intensity reaches the critical intensity Io), the blue emission is observed only at the converging position Zf. Pulsative laser beam is irradiated upon the workpiece, varying the average output and the distance between the condenser lens and the workpiece. In this procedure, the blue emission is observed only when Intensities of the irradiated pulsative laser beam exceed the critical intensity Io. And the pulse counter 26 counts the number of sensor output pulses corresponding to the pulsative light emissions. Therefore, as the converging position is moved closer to the workpiece by moving the condenser lens 4 the number of the counted pulse gradually increases; and as the converging position is moved farther away from the workpiece, the number of the counted pulse gradually decreases.

In this second embodiment, the change-over valve 8d is then switched to the Inert gas cylinder 8c, and the inert gas 8c is blown upon the workpiece 7 through the machining torch 6. At that time, the numerical control unit 21 drives the servo motor 9a in a manner that the condenser lens 4 is moved upward or downward between the higher position which is higher by about 10% of the focal length than a vertical level which is regarded to be the focus position of the condenser lens 4 and the lower position which is lower by about 10% of the focal length than the vertical level. Subsequently, the numerical control unit causes the laser oscillator 1 to output the laser beam, varying the pulse peak output by a constant width. When a blue emission is observed at the surface of the workpiece 7 during the while the laser oscillator is varying the pulse peak output of one reciprocation, the optical sensor 22 outputs the pulsative output signal 22a, and the number of the pulses in the output signal 22a is counted by the pulse counter 26. Upon finishing of varying the pulse, the numerical control unit 21 causes the condenser lens 4 to move upward or downward. The signal register 27 retains the number of the pulses counted by the pulse counter 26 at the initial moment when the signal 16 for driving the servo motor 9a is issued. Then, the number of the pulses in the output signal is similarly counted by varying the peak value of the pulse output of the laser oscillator 1. As the upward or downward movement of the condenser lens 4 is continued, the laser beam is gradually converged with nearing of the workpiece to the focus position of the condenser lens 4. Since the intensity of the same irradiated laser beam increases when being converged, the number of the pulses exceeding the critical intensity Io and accompanying blue emission per one period of varying of the pulse peak output increases. As a result, the output of the pulse counter 26 continues to increase and reaches to its maximum when the focus position comes to the surface of the workpiece. The comparator 28 compares the output from the pulse counter 26 with the output from the signal register 27. And when it finds that the number of the pulses counted by the pulse counter 26 continues to increase, it Indicates that the focus position is coming close to the workpiece 7. On the other hand, when it finds that the number of the pulses counted by the counter 26 begins to decrease, it indicates that the focus position is on the workpiece 7. Therefore, it is to be set that the position of the condenser lens 4 with respect to the workpiece 7 at the time of Inverting the sign of the output of the comparator 28 is the origin of the coordinate of the servo motor 9a for moving the machining torch 18.

Figure 5A:
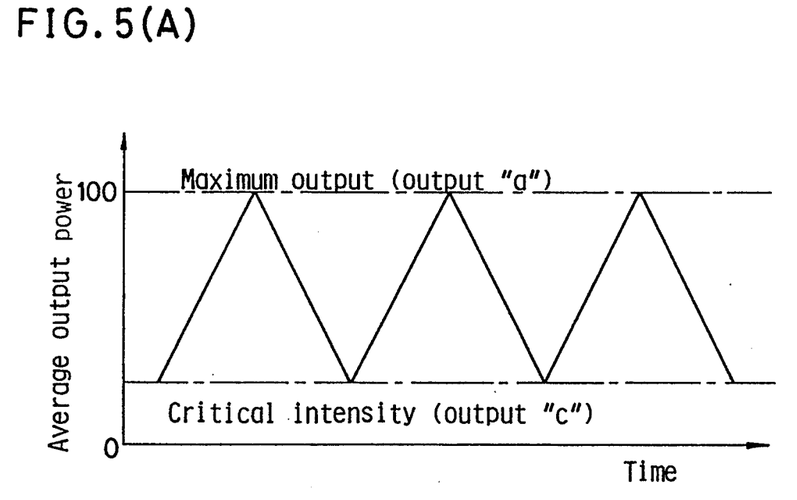
Figure 5B:
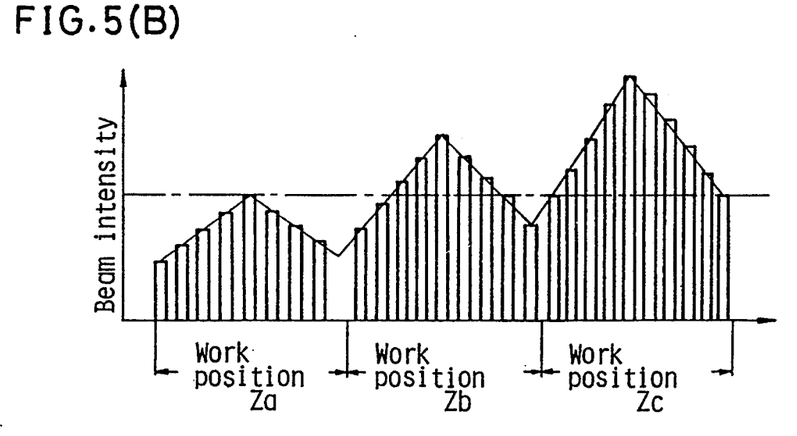
Figure 5C:
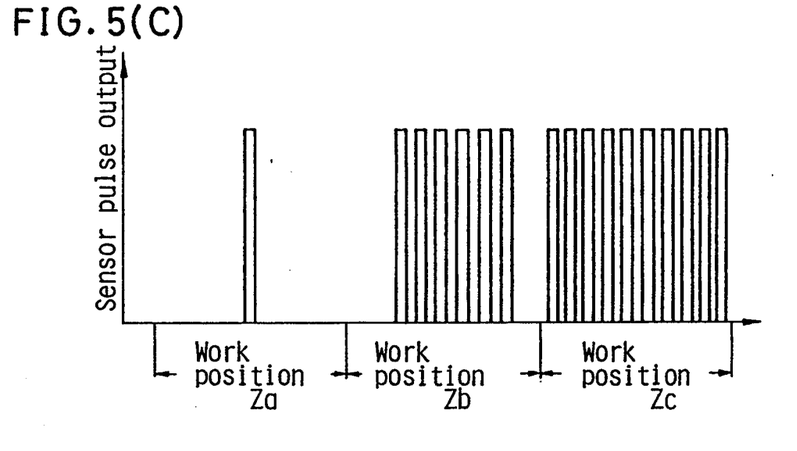

The beam Intensity and the pulse output of the optical sensor at various position, with the varying of the peak pulse output arc summarized In FIGS. 5 (A), 5 (B) and 5 (C). FIG.5 (A) shows a pattern diagram for varying the output power of the laser beam. FIG.5 (B) shows a graph for Illustrating the variation of the beam intensity in the three workpiece positions with the variation of the peak pulse output. FIG.5 (C) is a graph for illustrating the sensor pulse output in the three workpiece positions with the variation in the peak pulse output. In these figures, the symbols Za, Zb and Zf are corresponding to the symbols Za, Zb and Zf showing the positions in FIGS. 4 (B) and (C).

Variation of Example 2

Each of the above-mentioned two embodiments relates to a laser beam machining apparatus which searches the focus position by detecting the blue emission from the laser irradiated surface of the workpiece 7. Besides, the searching of the focus position can further be performed by utilizing an acoustic phenomenon that an explosive sounds are emitted when the blue emission at the surface of the workpiece 7 is emitted. This phenomenon can be used also to set the origin of the servo motor 9a. Namely, by using an audio sensor in place of the optical sensor 22, detecting the explosive sounds emitted when the blue emission is emitted at the surface of the workpiece 7 by the audio sensor. Thus by utilizing the output of the audio sensor in place of the output of the optical sensor 22, it is likewise possible to realize the operations of the above-mentioned two embodiments.

The procedure for matching the focus position to the workpiece surface by varying the position of the condenser lens 4 in the foregoing embodiments is memorized and stored In a memory 50 In the numerical control unit 21. And the numerical control unit 21 performs the setting of the origin at the beginning of the machining. When the machining is started, the numerical control unit 21 actually sets the relative distance between the condenser lens 4 and the workpiece 7, in accordance with the machining conditions, by moving the lens guide member 5 supporting the condenser lens 4. Then It causes the change-over valve 8d to change over to the assist gas cylinder 8b for the machining and starts to machine the workpiece 7 by blowing the assist gas upon the workpiece 7 through the machining torch 6.

EXAMPLE 1

In the following paragraphs, a third embodiment of the present invention will be described. Since the configuration of the third embodiment is substantially the same as that of the first embodiment which has been described with reference to FIG.1 and FIG.2, the description is limited to its operation.

At the start of the cutting operation, the numerical control unit 21 drives the servo motor 9a in a manner that the surface of the workpiece 7 is brought to the position regarded to be the focal length of the condenser lens 4. And the numerical control unit 21 causes the change-over valve 8d to switch to the inert gas cylinder 8c, thereby blowing the inert gas upon the workpiece 7 through the machining torch 6. Then the numerical control unit 21 raises the position of the condenser lens 4 from the surface of the workpiece 7 by driving the servo motor 9a, continuing to cause the laser oscillator 1 to issue the laser beam. In such a manner, the numerical control unit 21 gradually move the laser-irradiated spot to part from the focus position of the condenser lens 4.

During this procedure, the actual focusing spot of the laser beam removes from the former focus position with the rise of the condenser lens 4. Therefore, the intensity of the laser beam 1a irradiated upon the surface of the workpiece 7 decreases in reverse proportion manner to the increase of the cross-sectional area of the beam. Thereby the color of the emission issued from the laser-irradiated spot changes from blue to orange. At the same time when the color of the light changes from blue to orange, the output level of the optical sensor 22a falls.

The numerical control unit 21 memorizes the height of the condenser lens 4 at the time when the level of the output signal of the optical sensor 22a falls, and simultaneously stops the oscillation of the laser oscillator 1 and causes the change-over valve to switch to the assist gas cylinder 8b. Subsequently, the numerical control unit 21 drives the servo motor 9a and moves the condenser lens 4 to the memorized height position. The height position of the condenser lens 4 is set to such a position that the absorption factor of the laser beam 1a absorbed by the workpiece 7 is at its maximum value; and the cutting operation is started.

Hithertofore, when a cutting operation is continued for a certain time, the temperature of the workpiece 7 rises as a result of the absorption of the laser beam 1a by the workpiece and by reaction heat of the workpiece 7 with the assist gas 8b, induced by the laser beam 1a. Therefore, the dependency on laser beam intensity of the absorption factor of the workpiece 7 will vary accordingly, and the distance between the condenser lens 4 and the workpiece 7 will vary when a minute undulation exists in the shape of the workpiece. Therefore, sometimes the conditions of optimum machining rate cannot be maintained by the variation of absorption factor attributable to the variation in the irradiation intensity at the surface of the workpiece 7.

In this Example 3, the above-mentioned variation in the conditions attributable to the continuation of the machining is corrected in the following manner. The gist is that, after the completion of one machining cycle, the above-mentioned blue emission range is memorized by the numerical control unit 11 at the start of new machining cycle. And the memorized blue emission range is utilized at the start of the next machining cycle.

First, the numerical control unit 21 causes the change-over valve 8d to switch from the assist gas cylinder 8b to the inert gas cylinder 8c. And then the machining torch 6 is moved upward or downward in a range of about one fifth (1/5) of the blue emission range memorized in the numerical control unit 21, blowing the inert gas 8c upon the workpiece. It further adjusts the height of the machining torch 6 in a manner that a threshold height at which the emission color changes from the blue emission to the orange emission is taken as the height of the machining torch 6 at the level change of the output signal 22a of the optical sensor 22. Thereafter, the memory 50 in the numerical control unit 21 memorizes the height of the machining torch 6 at the level change of the output signal 22a, and moves the machining torch to that height by driving the servo motor 9a. Then the numerical control unit 21 actuates the change over valve 8d to switch from the hitherto connected inert gas cylinder 8c to the assist gas cylinder 8b. And thus the machining operation is started again.

In accordance with the above-mentioned configuration and method, it is now possible to automate the operation of setting the focus position of the condenser lens on the surface of the workpiece. It is also possible to always maintain the maximum machining rate, by maintaining the gap between the lower end tip of the machining torch and the workpiece surface as well as the relative position of the focus position of the condenser lens and the workpiece to their optimum positions, without regarding the diversity in the setting of the focus position attributable to the personal difference of the operator and the dispersion in the focal length of the condenser lens.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, It is intended that the appended claims be interpreted as covering all alterations and modifications as fall within the true spirit and scope of the invention.

What is claimed is:

1. A laser beam machining apparatus comprising:
   a laser oscillator,
   a guide for transmitting laser beam generated by said laser oscillator.
   a condenser lens for converging said laser beam,
   a machining torch for blowing a assist gas upon an objective surface of a workpiece,
   source and transmission means for feeding said assist gas,
   a movable machining table for movably holding a workpiece for performing the machining thereon,
   a servo-motor for driving said table to vary a distance between said condenser lens and said workpiece,
   a numerical control unit for controlling and driving said servo-motor, said machining table and said laser oscillator,
   a tracing unit including a position-sensor and a signal converter and mounted on said machining torch, for detecting the distance between said condenser lens and said workpiece,
   said tracing unit having an aperture for permitting the passage of the laser beam and the auxiliary gas therethrough; and
   a guide bearing for smoothly moving said tracing unit along the optical axis of said laser beam.

2. Method for adjusting the height of the condenser lens of a laser beam machining apparatus which includes;
   a laser oscillator for generating a laser beam,
   a condenser lens for converging said laser beam,
   a machining torch for blowing a assist gas upon an objective surface of a workpiece,
   a movable machining table for movably holding a workpiece for performing the machining thereon,
   a servo-motor for driving said condenser lens to vary a distance between said condenser lens and said workpiece,
   a numerical control unit for controlling said servo-motor, said machining table and said laser oscillator,
   a sensor for detecting light emission of a particular color from a laser-irradiated spot of the surface of said workpiece and issuing an output when said emission is received, and
   a memory device provided on said numerical control unit for memorizing the distances between said condenser lens and the workpiece for a plurality of times with respect to the variation of the output of said sensor;
   which method comprises;
   irradiating the laser beam upon the workpiece varying the distance between the condenser lens and the workpiece in a range including the focal length of said condenser lens,
   memorizing in said memory device the maximum value and minimum value of said distances between the condenser lens and the workpiece when said emission is issued, varying the laser Irradiating spot on said workpiece by moving the latter, and
   setting a center position which is calculated on the basis of said memorized maximum and minimum distance as an origin of the coordinate of said servo-motor.

3. Method for adjusting the height of the condenser lens of a laser beam machining apparatus which includes;
   a laser oscillator for generating a laser beam, a condenser lens for converging said laser beam, a machining torch for blowing a assist gas upon an objective surface of a workpiece, a movable machining table for movably holding a workpiece for performing the machining thereon, a servo-motor for driving said workpiece to vary a distance between said condenser lens and said workpiece, a numerical control unit including a memory device, for controlling said servo-motor, said machining table and said laser oscillator, a sensor for detecting light emission of a particular color from a laser-irradiated spot of the surface of said workpiece and issuing an output when said emission is received, and a pulse counter which receives the output issued from said sensor, a signal register which holds the output of said pulse counter at the instant immediately before issuance of a driving signal, for every time when said numerical control unit outputs the driving signal for said servo-motor, and a comparator which receives the output of said pulse counter and the output of said signal register to perform a comparison between the both outputs, and issues the result of said comparison as a basis to control said servo-motor, which method comprises;

irradiating the laser beam in a pulse state upon the workpiece varying the average output of the pulsative pulse, varying distance between the condenser lens and the workpiece for every one period of the varying average output of the pulse, and setting the position of said condenser lens with respect to the workpiece at the instant of the inversion of the sign of the output of said comparator as an origin of the coordinate of said serve-motor.

4. The method for adjusting the height of the condenser lens of a laser beam machining apparatus in accordance with claim 2 or 3 wherein;

said sensor is an optical sensor for detecting the emission issued from the laser-irradiated spot of the surface of the workpiece and for issuing an output when said emission turns to blue emission.

5. The method for adjusting the height of the condenser lens of a laser beam machining apparatus in accordance with claim 2 or 3, wherein;

said sensor is an audio sensor for detecting a sound issued from the laser-irradiated spot of the surface of the workpiece and for issuing an output when an explosive sound issued with a blue emission is detected.

6. The method for adjusting the height of the condenser lens of a laser beam machining apparatus in accordance with any one of claim 2 or 3, wherein a procedure for setting the origin of the coordinate of said servo-motor is performed by causing the memory device in said numerical control unit to memorize said procedure and run said procedure, accordingly.

7. The method for adjusting the height of the condenser lens of a laser beam machining apparatus in accordance with claim 4, wherein a procedure for setting the origin of the coordinate of said servo-motor is performed by causing the memory device in said numerical control unit to memorize said procedure and run said procedure, accordingly.

8. The method for adjusting the height of the condenser lens of a laser beam machining apparatus in accordance with claim 5, wherein a procedure for setting the origin of the coordinate of said servo-motor is performed by causing the memory device in said numerical control unit to memorize said procedure and run said procedure, accordingly.

9. A method for adjusting the height of the condenser lens of a laser beam machining apparatus which includes at least;

a laser oscillator for generating a laser beam, a mirror for turning said laser beam, a condenser lens for converging said laser beam, a guide for guiding said laser beam and supporting said condenser lens, a machining torch for blowing a assist gas upon an objective surface of a workpiece, a movable machining table for movably holding a workpiece for performing the machining, and a source for feeding said assist gas and an inert gas, a change-over valve for selectively controlling mixing of gas to be fed to said machining torch from said assist gas source and said inert gas source, a numerical control unit including a memory device, for controlling said machining table and said laser oscillator, which method comprises the steps of;

detecting a blue emission attributable to the gas in a plasma state evolved at the surface of the workpiece upon the irradiation with the laser beam, while blowing said inert gas on the workpiece, and setting the objective surface of the workpiece, in a range of approximately one fifth (1/5) of the length of a range of said blue emission above and below of the farther end from said condenser lens within such range of the lens height that said blue emission is detected.

10. The method for adjusting the height of the condenser lens of a laser beam machining apparatus in accordance with claim 9, further comprising the steps of:

causing said numerical control unit to memorize in said memory device said blue emission range at one machining cycle just before the current machining cycle of the workpiece, irradiating said laser beam upon the workpiece while vertically moving said condenser lens before the beginning of one machining cycle in a range of one fifth (1/5) of the blue emission range memorized in said numerical control unit, and while blowing said inert gas upon the workpiece, detecting color change of light between orange emission and said blue emission issued from the surface of said workpiece, and memorizing the height position data of said condenser lens at the instant of the color change, adjusting the distance from said lens to the objective surface of said workpiece based on said memorized height position data, in a manner that, by adjusting the height of the condenser lens, the height position of the farther one of the boundaries between the blue emission range and the orange emission range is brought to come on the surface of the objective workpiece, and causing said one machining to start while blowing the assist gas for the machining.

11. The method for adjusting the height of the condenser lens of a laser beam machining apparatus in accordance with claim 9 or 10, wherein; a procedure for setting the lens height is memorized In said memory device in said numerical control unit and run the procedure therewith.

* * * * *